United States Patent [19]

Ushiro et al.

[11] Patent Number: 5,753,176
[45] Date of Patent: May 19, 1998

[54] PROCESS FOR PRODUCING A VOLTAGE-DEPENDENT NONLINEAR RESISTOR

[75] Inventors: Tomoaki Ushiro; Hiroshi Komatsu; Tooru Tominaga; Hiroyuki Kubota; Kazutaka Nakamura; Masahiro Yuruki, all of Kyoto, Japan

[73] Assignee: Murata Manufacturing Co. Ltd., Kyoto-fu, Japan

[21] Appl. No.: 677,619

[22] Filed: Jul. 8, 1996

Related U.S. Application Data

[63] Continuation of Ser. No. 423,320, Apr. 18, 1995, abandoned.

[30] Foreign Application Priority Data

Apr. 18, 1994 [JP] Japan ............................ 6-078713

[51] Int. Cl.$^6$ .......................... C04B 37/00; C04B 35/10
[52] U.S. Cl. .......................... 264/617; 156/89; 264/624
[58] Field of Search .......................... 264/617, 624, 264/621; 156/89; 252/518

[56] References Cited

U.S. PATENT DOCUMENTS

| | | | |
|---|---|---|---|
| 4,767,729 | 8/1988 | Osman et al. | 501/94 |
| 4,861,743 | 8/1989 | Flank et al. | 502/214 |
| 4,894,185 | 1/1990 | Djega-Mariadassou et al. | 252/519 |
| 4,996,510 | 2/1991 | Becker et al. | 338/21 |
| 5,039,452 | 8/1991 | Thompson et al. | 252/518 |
| 5,076,979 | 12/1991 | Ochi et al. | 264/61 |

FOREIGN PATENT DOCUMENTS 54-163395  12/1979  Japan.

OTHER PUBLICATIONS

NIST Standard Reference Database, entry for aluminum isopropoxide, 1991.

*Primary Examiner*—Christopher A. Fiorilla
*Attorney, Agent, or Firm*—Ostrolenk, Faber, Gerb & Soffen, LLP

[57] ABSTRACT

A process for producing a voltage-dependent nonlinear resistor that contains zinc oxide as a major component and that also contains a minor oxide component, is improved by the steps of adding an organometallic compound as the minor oxide component to the powder of zinc oxide, mixing the two components, forming the mixture into a shape and sintering the shape. The organometallic compound as the minor oxide component is either a compound in which a hydrocarbon group is bound to a metal atom or a compound in which the hydrogen atom in a carboxyl, hydroxyl, imino group, etc., is replaced by a metal. The method is capable of reducing the scattering of the electrical characteristics of the voltage-dependent nonlinear resistor, which contributes to an improvement of the change of varistor voltage by surge current.

3 Claims, 1 Drawing Sheet

PROCESS FOR PRODUCING A VOLTAGE-DEPENDENT NONLINEAR RESISTOR

This is a Continuation of application Ser. No. 08/423,320 filed on Apr. 18, 1995 now abandoned.

BACKGROUND OF THE INVENTION

1. Field of the Invention

This invention relates to a voltage-dependent nonlinear resistor (hereunder referred to as a "varistor") and more particularly to a process for producing a varistor containing zinc oxide as a main component.

2. Description of the Related Art

Communications equipment and various other electronic apparatus have recently seen rapid progress in the effort toward smaller sizes and the integration of electronic parts; varistors used as noise absorbers are not an exception and there is a strong need for a smaller size and a lower operating voltage. Speaking of electronic apparatus installed with a microcomputer, the need to perform digital control processing involves potential failure and wrong operation of semiconductor devices due to electromagnetic noise. Common sources of noise in electronic apparatus are power supplies and signalling wire harnesses and, hence, the importance of noise filters installed at inputs to and outputs from those areas cannot be overstressed.

To solve the problem of electromagnetic noise, it is essential that noise be completely isolated from the electronic apparatus or it should not leak out of or should not be admitted into the apparatus. Varistors containing zinc oxide as a chief component have heretofore been proposed for use as devices that protect electronic apparatus from electromagnetic noise (see, for example, Japanese Patent Unexamined Application (kokai) Sho 54-163395).

Laminated varistors containing zinc oxide as a chief component have conventionally been produced by the following procedure: a zinc oxide powder as the chief component is mixed with small amounts of the powders of additive metal oxides such as cobalt, manganese, antimony, chromium, bismuth, tin, nickel, iron, aluminum, indium, lanthanum, neodymium, praseodymium and cerium and the mixture is slurried to form a sheet. The resulting ceramic green sheet is printed with a conductive paste that will provide an internal electrode. A plurality of such ceramic green sheets are superposed and thermally compressed together to form a laminate, which is sliced to a chip of a specified size and fired at a sufficiently high temperature to produce a sinter. The sinter is fitted with external electrodes to complete formation of a laminated varistor.

This approach has a serious problem that mainly originates from the considerable difficulty involved in achieving uniform mixing of zinc oxide with the powders of metal oxides; as a result, the mixing time must be extended significantly and the greater load on the disperser increases the chance of entrance of foreign matter from the disperser. If the particles of metal oxides are dispersed unevenly due to insufficient mixing, the electrical characteristics of the laminated varistor such as varistor voltage and static capacitance will scatter or a marked characteristic deterioration occurs in a surge current withstanding test.

SUMMARY OF THE INVENTION

The present invention has been accomplished under these circumstances and an object of the invention is to provide a process for producing a voltage-dependent nonlinear resistor that is capable of uniform mixing of the powders of metal oxides to achieve an improvement in the change of varistor voltage by surge current.

This object can be attained by a process for producing a voltage-dependent nonlinear resistor that contains zinc oxide as a major component and that also contains a minor oxide component, characterized by comprising the steps of adding an organometallic compound as the minor oxide component to the powder of zinc oxide, mixing the two components, forming the mixture into a shape and sintering the shape.

The object can also be attained by a process for producing a voltage-dependent nonlinear resistor that contains zinc oxide as a major component and that contains a minor oxide component, characterized by comprising the steps of adding an organometallic compound as the minor oxide component to the powder of zinc oxide, mixing the two components in a solvent capable of dissolving the organometallic compound, forming the mixture into a shape and sintering the shape.

In a preferred embodiment of either case, the organometallic compound as the minor oxide component is either a compound in which a hydrocarbon group is bound to a metal atom or a compound in which the hydrogen atom in a carboxyl, hydroxyl, imino group, etc., is replaced by a metal.

If an organometallic compound such as an organoaluminum, organobismuth, organomanganese, organocobalt or organoantimony compound is added to a zinc oxide based varistor, the two components can be mixed uniformly to ensure against uneven dispersion of the additive. This is effective in not only reducing the scattering of electrical characteristics of the varistor but also improving the change of varistor voltage by surge current.

The nature, utility and principle of the invention will be more clearly understood from the following detailed description and the appended claims when read in conjunction with the accompanying drawings.

DETAILED DESCRIPTION OF THE INVENTION

Figure 1:
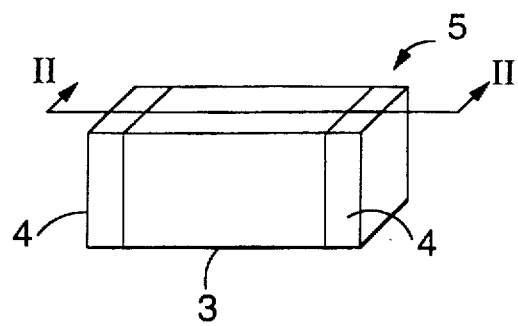
FIG. 1 is a perspective view of a laminated varistor fabricated in accordance with an example of the invention.
Figure 2:
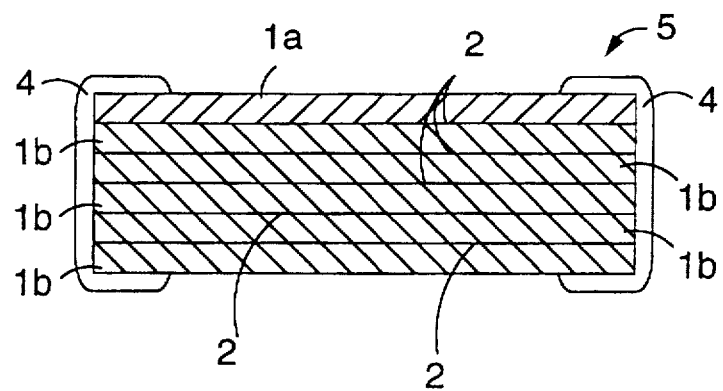
FIG. 2 is a sectional view of the laminated varistor as taken along line II—II of FIG. 1.

FIGS. 1 and 2 illustrate a laminated varistor that was fabricated by implementing the process of the invention; FIG. 1 is a perspective view of the laminated varistor, and FIG. 2 is a sectional view of the laminated varistor as taken along line II—II of FIG. 1.

Referring to FIGS. 1 and 2, an internal electrode 2 is formed on one principal surface of a varistor layer 1b. A plurality of varistor layers 1b each carrying the internal electrode 2 are placed in a superposed relationship with a varistor layer 1a having no internal electrode 2 and the assembly is fired at a sufficiently high temperature to produce a sinter 3. The sinter 3 has an external electrode 4 provided at both end faces so that it is connected to the internal electrodes 2, thereby completing a laminated varistor 5. The varistor layers 1b each being held between internal electrodes 2 in the laminated varistor 5 will develop the varistor characteristic, or nonlinear voltage dependency.

An example of the invention will now be described with particular reference being made to the steps for fabricating the laminated varistor 5 shown in FIG. 1. A varistor feed was prepared by the following procedure: 96.77 mol % of ZnO (purity ≧99.0%), 1.50 mol % of $Bi_2O_3$, 0.50 mol % of $MnCO_3$, 0.52 mol % of $Co_2O_3$ and 0.70 mol % of $Sb_2O_3$ were first provided; to these ceramic components, an organometallic alkoxide (aluminum triisopropoxide) was added in a metered amount of 0.01 mol % as $Al_2O_3$ and also added was zinc borosilicate glass in a metered amount of 1.0 wt %. The respective components of the varistor feed were mixed under stirring in an organic solvent for 2 to 3 hours; thereafter, an organic binder was added, followed by further mixing to form a slurry.

The slurry was shaped by doctor blade coating and the solvent was evaporated to form a ceramic green sheet with a uniform thickness of 50 to 150 μm. The sheet was cut to a rectangular form measuring 58.6×76.4 mm (which corresponds to varistor layer 1a in FIG. 2).

The thus prepared ceramic green sheet 1a was printed with a conductive paste that would provide an internal electrode 2 when sintered (the resulting sheet corresponds to varistor layer 1b). The conductive paste was an Ag-Pd alloy paste and screen printed onto the green sheet 1a. The thus provided ceramic green sheets 1b and the ceramic green sheet 1a with no printed pattern of the conductive paste were superposed, with the internal electrode providing conductive paste being disposed as shown in FIG. 2, and the individual sheets were thermally compressed.

The resulting assembly was cut to a specified size such that the conductive paste would become exposed in selected areas of the lateral sides and the assembly was fired at 900 to 1,000° C. for 2 to 3 hours. Subsequently, an Ag-Pd electrode was applied to both end faces of the sinter 3 where the internal electrodes 2 were exposed, and the applied coat was baked at 850° C. to form external electrodes 4, thereby completing a laminated varistor 5.

The thus fabricated laminated varistor 5 was measured for varistor voltage, static capacitance and dielectric loss by the methods that are mentioned below. As a comparison, a varistor was fabricated by repeating the above-described procedure on a feed of the conventional formula which was identical to the invention formula, except that the aluminum triisopropoxide present in 320 ppm (corresponding to 0.01 mol % in terms of $Al_2O_3$) was replaced by 0.01 mol % of an alumina ($Al_2O_3$) powder.

Varistor voltage was measured as the voltage developing at a d.c. current of 1 mA. Static capacitance and dielectric loss were measured with an automatic bridge-type instrument at a frequency of 1 MHz, a voltage of 1 Vrms and a temperature of 25° C. A surge current withstanding test was conducted by the following procedure: a pulse of 200 A (8×20 μsec) was applied twice at a 5min interval and the percent change in $V_{10\mu A}$ was calculated for 20 samples. The results are shown in Table 1 below.

TABLE 1

| Sample | | Varistor Voltage (V) | Static Capacitance (pF) | Dielectric Loss (%) | Percent Change in $V_{io}$ μA by Surge Current (%) |
|---|---|---|---|---|---|
| Aluminum alkoxide added product | Mean | 30.3 | 2360 | 0.9 | −1.4 |
| | S.D. | 0.21 | 45.0 | 0.01 | 0.04 |

TABLE 1-continued

| Sample | | Varistor Voltage (V) | Static Capacitance (pF) | Dielectric Loss (%) | Percent Change in $V_{io}$ μA by Surge Current (%) |
|---|---|---|---|---|---|
| (Invention) | | | | | |
| Aluminum powder added product (conventional) | Mean | 30.7 | 2230 | 1.5 | −15.3 |
| | S.D. | 0.33 | 123.0 | 0.05 | 0.28 |

As Table 1 shows, the varistor of the invention was not different from the comparison in terms of mean varistor voltage and static capacitance but the standard deviations of the respective factors decreased; as regards dielectric loss and the change in $V_{io}$ μA by surge current, the varistor of the invention was improved in both mean values and standard deviations.

In the example described above, an organometallic alkoxide (aluminum triisopropoxide) was added as a minor oxide component to the ceramic components. This may be replaced by an organometallic compound in which the hydrogen atom in a hydrocarbon group such as an alkyl or aryl group, a carboxyl group as in a metal soap, or a hydroxyl group as in an alcohol or phenol, or an imino group is replaced by a metal.

In the example, aluminum triisopropoxide was used as an organometallic compound but this may be replaced by any one of the following organometallic compounds as oxides (R in the following structural formulae represents an alkyl or aryl hydrocarbon group; C is carbon; O is oxygen; Me is metal; and H is hydrogen). i) organometallic compounds having metal soaps (R-COOMe), as exemplified by bismuth naphthenate, manganese naphthenate, cobalt naphthenate, lanthanum naphthenate, zirconium naphthenate, bismuth octylate, manganese octylate, cobalt octylate, lanthanum octylate, cerium octylate, indium octylate, tin octylate, nickel octylate, zirconium octylate, etc.; ii) organometallic compounds having acetylacetone metal salts [$Me(C_5H_7O_2)_x$], as exemplified by aluminum acetylacetonate, cobalt acetylacetonate, manganese acetylacetonate, chromium acetylacetonate, nickel acetylacetonate, indium acetylacetonate, cerium acetylacetonate, lanthanum acetylacetonate, zirconium acetylacetonate, tin acetylacetonate, etc.; iii) organometallic compounds having metal alkoxides (R-OMe), as exemplified by antimony triethoxide, antimony tri-n-butoxide, bismuth 2-ethoxyethylate, aluminum triisopropoxide, aluminum triisobutoxide, aluminum butoxide, tin di-n-butoxide, etc.; and iv) organometallic compounds having alkyl metals (R-Me), as exemplified by tetramethyltin and tetraethyltin.

In the invention, a varistor containing zinc oxide as a major component and an oxide as a very minor component is fabricated by adding the minor component in the form of an organometallic compound and this allows the added organometallic compound to be mixed uniformly in the zinc oxide and hence dispersed evenly in the latter. Since the added organometallic compound is dispersed evenly, the scattering of electrical characteristics of the varistor is reduced and the change of varistor voltage by surge current is improved.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A process for producing a voltage-dependent nonlinear resistor that contains zinc oxide as a major component and a minor aluminum oxide component, said process comprising the steps of:

adding an aluminum organometallic compound which becomes the minor aluminum oxide component on sintering, to a powder of zinc oxide wherein the organometallic compound is selected from the group consisting of aluminum alkoxides and alkyl aluminums;

mixing the organometallic and zinc oxide components in an organic solvent capable of dissolving the organometallic compound;

forming the resulting mixture into a shape; and sintering the shape.

2. A process according to claim 1, wherein the organometallic compound is an aluminum alkoxide.

3. A process according to claim 2, wherein the organometallic compound is aluminum tri-isopropoxide.

* * * * *